United States Patent
Grassi (12)

(10) Patent No.: US 6,180,917 B1
(45) Date of Patent: Jan. 30, 2001

(54) LASER BEAM MACHINE WITH A CANTILEVER ARM

(75) Inventor: Fabrizio Grassi, Turin (IT)

(73) Assignee: Prima Industrie S.p.A., Turin (IT)

(*) Notice: Under 35 U.S.C. 154(b), the term of this patent shall be extended for 0 days.

(21) Appl. No.: 09/270,067

(22) Filed: Mar. 16, 1999

(30) Foreign Application Priority Data

Mar. 16, 1998 (IT) .............................................. T098A0225

(51) Int. Cl.$^7$ .................................................. B23K 26/00
(52) U.S. Cl. ..................................................... 219/121.78
(58) Field of Search ..................... 219/121.78, 121.79, 219/121.8, 121.81

(56) References Cited

U.S. PATENT DOCUMENTS

| | | | | |
|---|---|---|---|---|
| 4,808,791 | * | 2/1989 | Puozzo et al. | 219/121.78 |
| 4,851,637 | * | 7/1989 | Puozzo et al. | 219/121.78 |
| 5,310,991 | * | 5/1994 | Franco | 219/121.78 |
| 5,373,136 | | 12/1994 | Ernst et al. | |
| 5,637,243 | * | 6/1997 | Sato et al. | 219/121.78 |

FOREIGN PATENT DOCUMENTS

| | | |
|---|---|---|
| 42 19 134A | 1/1994 | (DE). |
| 196 30 074A | 1/1998 | (DE). |

* cited by examiner

*Primary Examiner*—Geoffrey S. Evan
(74) *Attorney, Agent, or Firm*—Sughrue, Mion, Zinn, Macpeak & Seas PLLC

(57) ABSTRACT

A manufacturing machine, in particular a laser machine including a base provided with a first guide extending along a first horizontal direction and an arm slidably mounted along the first guide and projecting in cantilever fashion from the base, the arm being provided with a second guide along which a manufacturing head is slidable. The arm is connected to the base by a hinge with a vertical axis and is movable between a normal operating position and a transport inclined position.

4 Claims, 4 Drawing Sheets

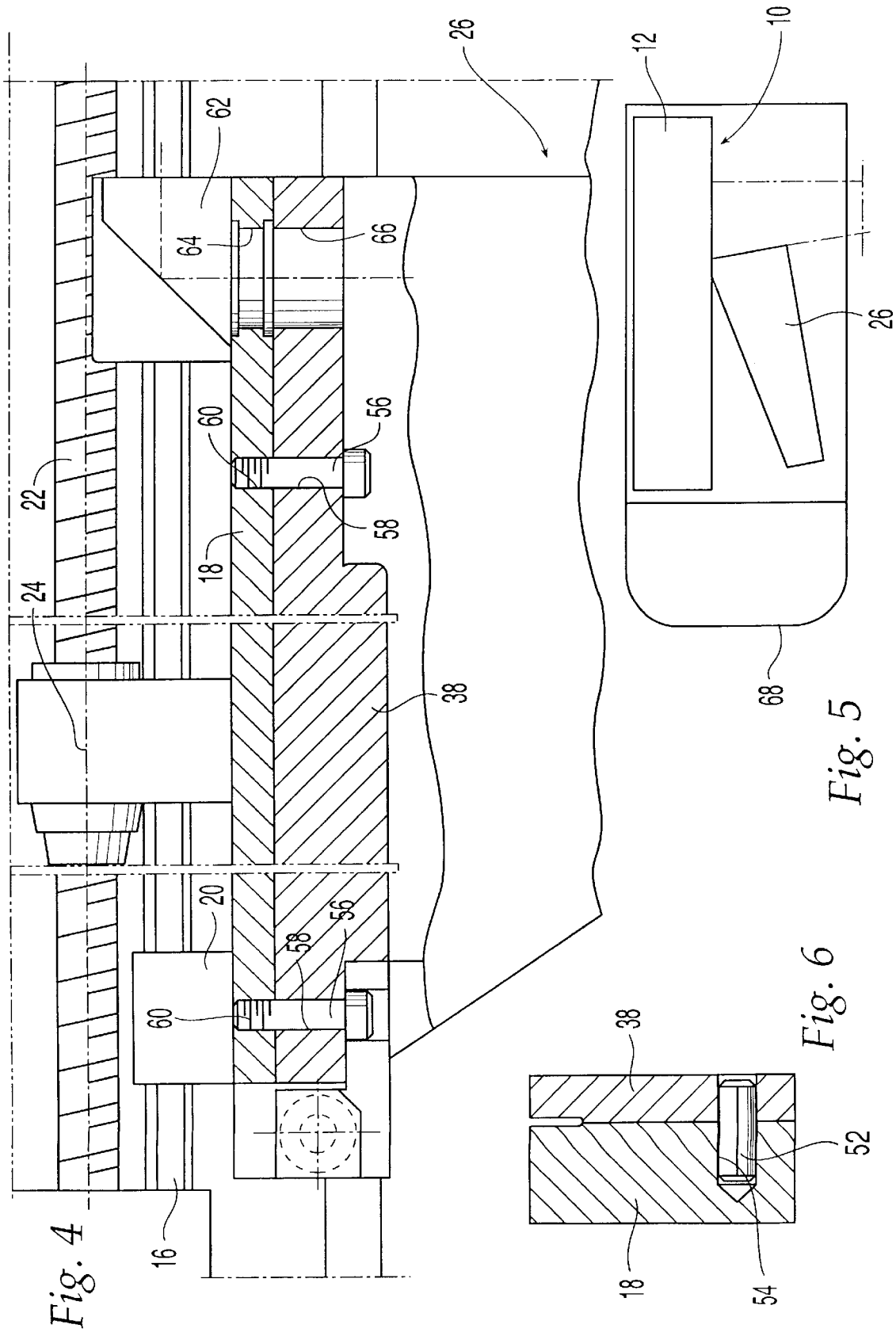

LASER BEAM MACHINE WITH A CANTILEVER ARM

BACKGROUND OF THE INVENTION

The present invention relates to a manufacturing machine, in particular a laser machine, of the type comprising a base provided with a horizontal guide on which is slidably mounted a cantilever arm projecting from the base, and wherein the arm carries a second guide, orthogonal to the first guide, along which a manufacturing head is slidably mounted, which in the case of a laser machine is formed by a focusing head.

The applicant has manufactured with great commercial success a machine of this type known with the trademark "Platino 1325" having net work travels of 1300×2500 mm. One of the major advantages of this machine is that it can be transported from the construction site to the installation site without being disassembled. In fact, the maximum transversal dimension of the machine (in the direction of the longitudinal direction of the cantilever arm) is about 2400 mm which is the maximum width admitted by the rules of the road for ordinary road transports. Machine of this type with greater transversal dimension should be disassembled for the transport and would need skilled operators for reassembling and setting up the machine in the installation site, which involves an increase of the transport and installation time and of the cost of the machine.

SUMMARY OF THE INVENTION

The problem on which the present invention is based is to provide a machine with net work travels higher than those of the known machine mentioned above, and which anyhow, can be transported in a monolithic form.

According to the present invention, this object is achieved by virtue of the fact that the arm is connected to the base by means of a hinge with a vertical axis and is movable between a normal operating position and a transport position.

By virtue of this idea of solution, machines can be manufactured with transversal net work travel of 1.5 meters and over, which can be contained into the clearance gauge of ordinary road transports by simply inclining the arm with respect to its normal operating position. On the installation site the arm is fixed in its normal operating position by simple and fast operations which do not need elaborate setting up.

A further advantage of the machine according to the invention consists in that the arm can be easily brought in its inclined position during maintenance operations, for facilitating access to parts of the machine which in traditional solutions can be accessed only with great difficulties.

BRIEF DESCRIPTION OF THE DRAWING

Further characteristics and advantages of the present invention will become clear in the course of the detailed description which follows, given purely by way of non-limiting example, with reference to the annexed drawings, in which:

FIG. 4 is a horizontal section showing the arm in its normal operating position, FIG. 5 is a plane schematic view showing the lateral dimension of the machine according to the invention, and FIG. 6 shows a detail of the connecting portion of the arm.

DETAILED DESCRIPTION OF THE INVENTION

Figure 1:
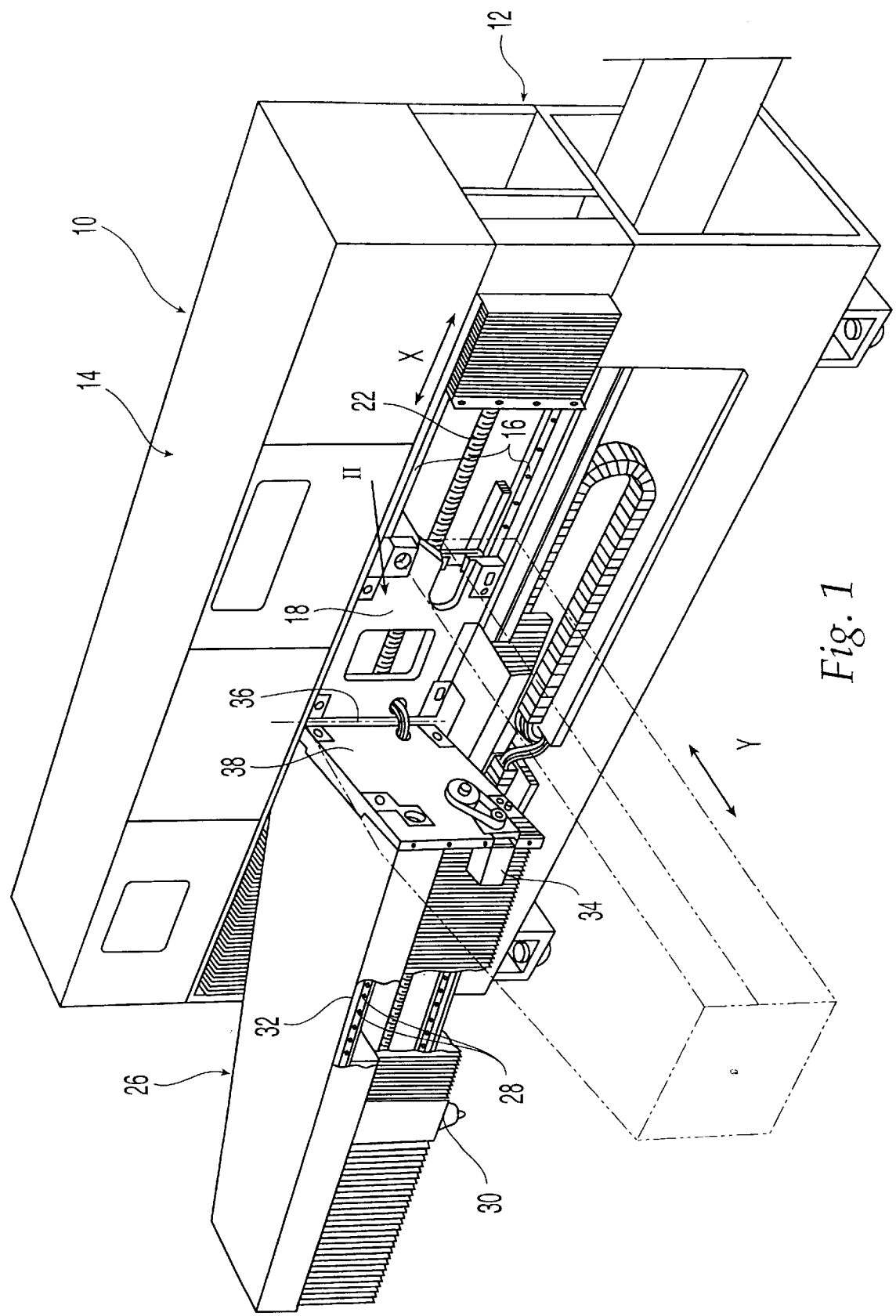
FIG. 1 is a schematic perspective view of a machine according to the present invention.

With reference to the figures, 10 indicates a laser machine comprising a base 12 formed by stout welded sheet metal and section bars. In the example shown in the figures, the base 12 has an elongated parallelepipedal shape and carries on its top a laser generator 14 of a type per se known. The base 12 has a pair of guides 16 extending along a horizontal direction X. A support blade 18 is slidably mounted along the guides 16 by means of sliding shoes 20. The support plate 18 can be moved along the direction X by means of a screw 22 which is rotated by a numerically controlled motor (not shown) which engages a nut screw 24 (FIG. 4) fixed to the plate 18. The machine 10 is provided with a cantilever arm 26 having transversal guides 28 along which a manufacturing head is slidably mounted, which can be moved by a screw 32 driven by a numerically controlled motor 24. According to the present invention, the arm 26 is articulated to the base 12 about a vertical axis 36 and is movable between a normal operating position (shown in dotted line in FIG. 1) and a generically inclined transport position shown in solid line in FIG. 1. In the normal operating position the arm 26 extends along a direction Y orthogonal to the axis X.

Figure 3:
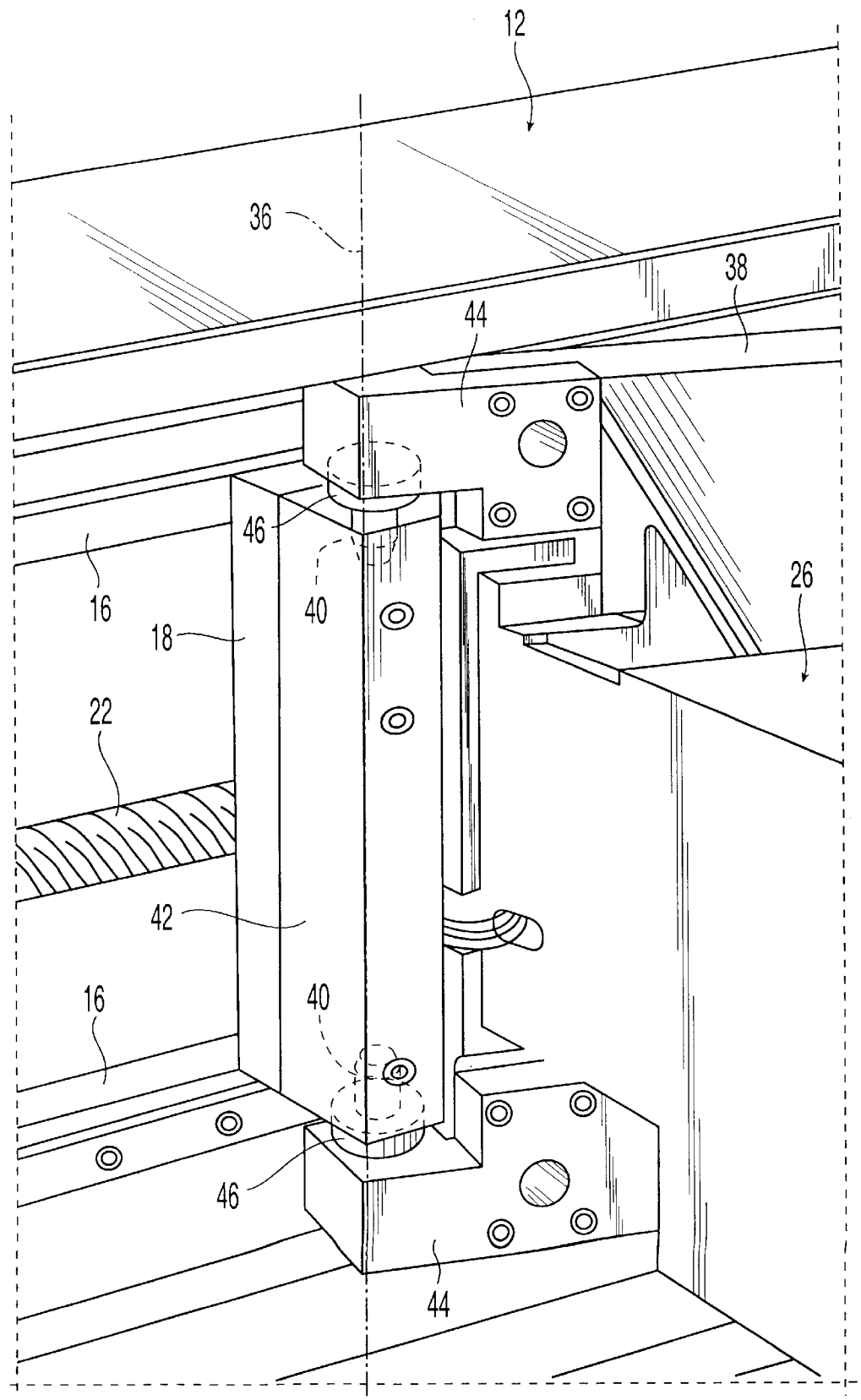
FIG. 3 is a perspective view of the articulation portion of the arm, along the arrow III of FIG. 2.

The arm 26 carries a reference plate 38 which is articulated to the support plate 18 about the vertical axis 36. As shown in FIG. 3, the articulation between the two plates 18, 38 is obtained by means of a pair of pins 40 carried by a hinge element 42 fixed to the plate 18. The reference plate 48 carries two hinge elements 44 disposed above and below the hinge element 42 carried by the support plate 18. Each pin 40 is fixed to the inner ring of a roller bearing 46 whose outer ring is fixed to the respective hinge element 44.

Figure 2:
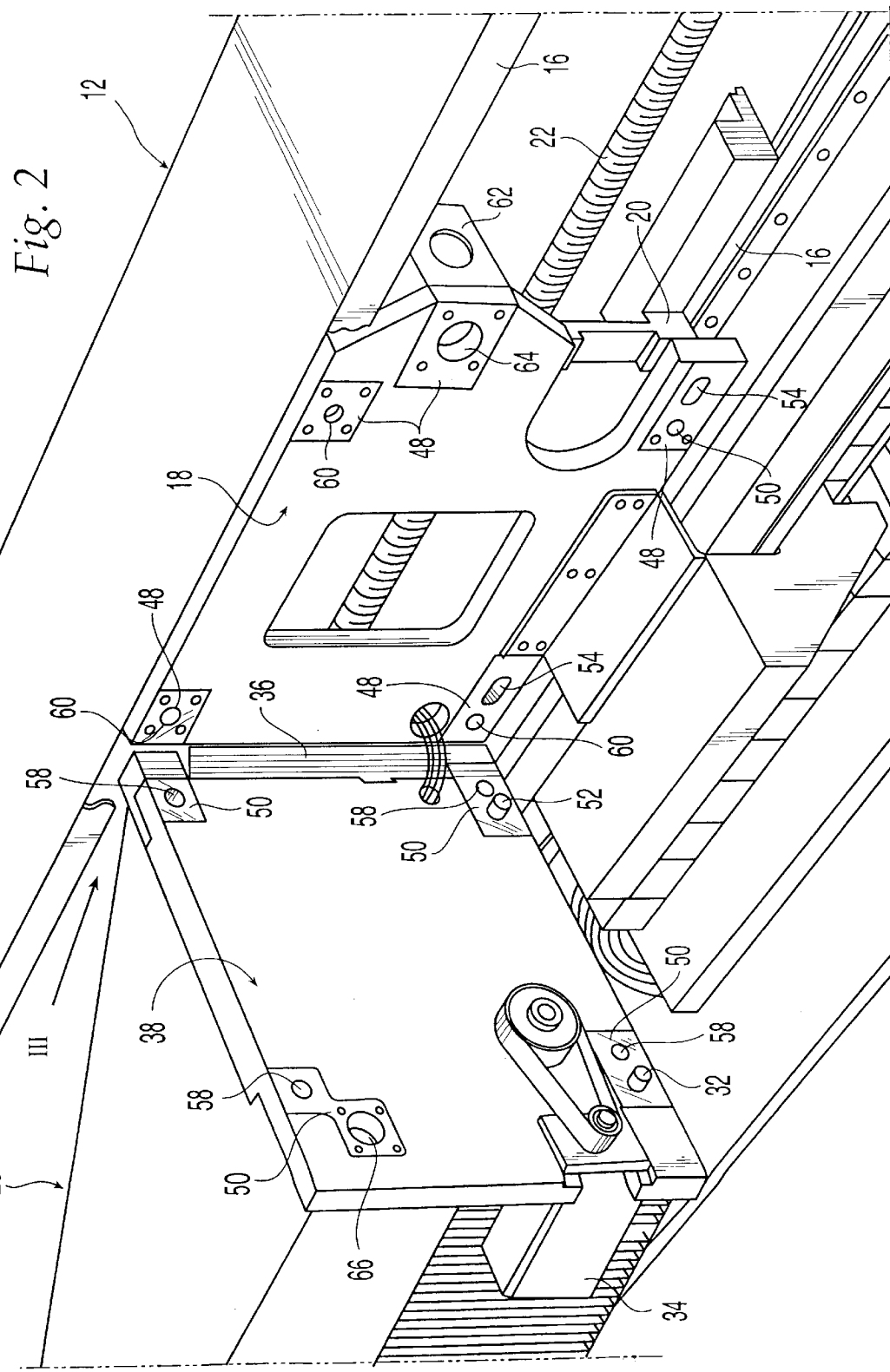
FIG. 2 is a perspective view in a greater scale of the part indicated by the arrow II in FIG. 1.

Referring to FIGS. 2 and 4, the support plate 18 carries an optical deflection assembly 62 which is adapted to deflect of 90° a laser beam which it receives along a direction parallel to the axis X. The plates 18, 36 are provided with respective holes 64, 66 for the passage of the deflected laser beam.

With reference in particular to FIG. 2, the support plate 18 and the reference plate 38 are provided with respective ground reference surfaces 48, 50 which are intended to contact with each other in the normal operating position of the machine. The angular reference position between the arm 26 and the support plate 18 is obtained by means of a pair of pins 52 projecting from the reference plate 38, which are intended to engage respective slots 54 formed in the support plate 18 (see also FIG. 6). In the normal operating position of the machine, the reference plate 38 is fixed to the support plate 18 by means of a plurality of screws 56 (FIG. 4) which extend through holes 58 formed in the reference plate 38 and engage threaded holes 60 formed in the support plate 18. The arm 26 is integrally formed with the reference plate 38 and projects in a cantilever fashion therefrom. Therefore, the whole arm 26 can be fixed to the support plate 18 or can be rendered free to rotate about the axis 36 by simply removing the screws 56 which fix the reference plate 38 to the support plate 18. Fixing between this two plates is formed so that in the normal operating conditions the articulation hinge formed by the bearings 46 and pins 40 is unloaded. Static and dynamic forces acting on the arm 26 are compensated by friction forces existing between the ground surfaces 48, 50 which are kept in a mutual contact by the tension of the screws 56. In this way, a high positioning precision of the arm 26 with respect to the support plate 18 is ensured, without the necessity of carrying out a precise set up of the arm 26 with respect to the axes of the machine. Therefore, the machine 10 can be completely assembled and set up in the production site, and during the construction the correlation between all the axes of the machine is defined. For transporting the machine 10, the arm 26 is brought in its inclined position so that the machine 10 is contained in the clearance gauge of loads transportable on road vehicles, as schematically shown in FIG. 5 wherein 68 generally indicates a vehicle for the road transport of the machine 10. The installation on the site of use of the machine 10 is very simple in that it is sufficient to bring the arm 26 in its normal operating position and tighten the screws 56. No other set up operation is necessary for ensuring the precise reference position of the guides 28 of the arm 26 with respect to the guides 16 of the base 12.

After the installation in the site of use, the possibility of inclining the arm 26 can be advantageously exploited for increasing accessibility to zones placed at the base of the arm 26 for either routine or extraordinary maintenance operations.

What is claimed is:

1. A laser beam machine comprising:

a base provided with a first guide means extending along a first horizontal direction, an arm slidably mounted on the first guide means and projecting in a cantilever fashion from said base, the arm carrying a second guide means extending along a second horizontal direction orthogonal to the first one, a manufacturing head slidable along the second guide means, wherein the arm is connected to the base by a hinge with a vertical axis and is movable between a normal operating position transversal to the base and an inclined transport position in which the arm forms an acute angle with respect to the base.

2. A manufacturing machine according to claim 1, comprising a support plate slidably mounted along said first guide means and a reference plate fixed to the arm and articulated to the support plate by hinge.

3. A manufacturing machine according to claim 2, wherein the support plate and the reference plate are provided with respective reference surfaces which in said normal operating position are kept in reciprocal contact by the tension of screws.

4. A manufacturing machine according to claim 2, wherein said hinge comprises a pair of pins aligned along said articulation axis and associated with respective roller bearings.

* * * * *